United States Patent
Rivin et al.

[11] Patent Number: 6,164,689
[45] Date of Patent: Dec. 26, 2000

[54] VIBRATION ABSORBING APPARATUS FOR STEERING WHEEL WITH AN AIRBAG

[75] Inventors: Evgeny I. Rivin, Southfield, Mich.; Vijayarumar A. Tipnis, Atlanta, Ga.; James L. Swayze, S. Rockwood, Mich.

[73] Assignee: Ford Global Technologies, Inc., Dearborn, Mich.

[21] Appl. No.: 08/924,915

[22] Filed: Sep. 8, 1997

Related U.S. Application Data

[62] Division of application No. 08/586,113, Jan. 16, 1996, abandoned.

[51] Int. Cl.⁷ ............................. B60R 21/20; B62D 1/04
[52] U.S. Cl. ............................................. 280/731; 74/552
[58] Field of Search ..................... 280/731, 728.2; 74/552

[56] References Cited

U.S. PATENT DOCUMENTS

| | | | |
|---|---|---|---|
| D. 347,820 | 6/1994 | Plymale | D12/176 |
| 3,708,181 | 1/1973 | Mazelsky | 280/740 |
| 3,787,075 | 1/1974 | Francis | 280/731 |
| 3,944,251 | 3/1976 | Lynch | 280/731 |
| 4,474,257 | 10/1984 | Lee | 180/271 |
| 4,785,144 | 11/1988 | Fosnaugh et al. | 280/731 |
| 4,886,295 | 12/1989 | Browne | 280/777 |
| 5,024,464 | 6/1991 | Kawaguchi et al. | 280/731 |
| 5,228,362 | 7/1993 | Chen et al. | 74/552 |
| 5,280,946 | 1/1994 | Adams et al. | 280/728.2 |
| 5,314,203 | 5/1994 | Adams et al. | 280/728.2 |
| 5,327,796 | 7/1994 | Ernst et al. | 280/731 |
| 5,356,173 | 10/1994 | Hongou et al. | 280/728.2 |
| 5,383,682 | 1/1995 | Nagata et al. | 280/731 |
| 5,410,114 | 4/1995 | Furuie et al. | 200/61.55 |
| 5,452,979 | 9/1995 | Cosenza | 411/348 |
| 5,599,039 | 2/1997 | Goss et al. | 280/731 |

FOREIGN PATENT DOCUMENTS

| | | | |
|---|---|---|---|
| 572125 | 12/1993 | European Pat. Off. | 280/731 |
| 2 248 925 | 4/1974 | Germany . | |
| 2 408 174 | 9/1974 | Germany . | |
| 3710173 A1 | 10/1988 | Germany . | |
| 2-48267 | 2/1990 | Japan . | |
| 4-143143 | 5/1992 | Japan . | |
| 4-169357 | 6/1992 | Japan . | |
| 5-85368 | 4/1993 | Japan . | |
| 6-40303 | 2/1994 | Japan . | |
| 6-191413 | 7/1994 | Japan | 280/731 |
| 6-270817 | 9/1994 | Japan . | |
| 1123818 | 8/1968 | United Kingdom . | |
| 1531069 | 11/1978 | United Kingdom . | |
| 2270883 | 3/1994 | United Kingdom | 280/731 |

*Primary Examiner*—Peter C. English
*Attorney, Agent, or Firm*—Gregory P. Brown

[57] ABSTRACT

A vibration absorbing apparatus for a steering wheel (10) having an airbag assembly (16) attached to the steering wheel (10). The air bag assembly (16) is attached to a reaction plate (18) which is resiliently attached to an absorber plate (22) with elastomeric members (26). Attachment by the elastomeric members (26) is such that a predetermined resiliency of the elastomeric members (26) is not affected. This provides a consistent and repeatable apparatus for attachment, ensuring proper and efficient operation of the airbag as a mass damper.

1 Claim, 2 Drawing Sheets

VIBRATION ABSORBING APPARATUS FOR STEERING WHEEL WITH AN AIRBAG

This application is a division of application Ser. No. 08/586,113, filed Jan. 16, 1996, abandoned.

BACKGROUND OF THE INVENTION

1. Field of the Invention

This invention relates to mass dampers for reducing undesirable vibration in automobiles having an airbag mounted in a steering wheel. More particularly, the present invention provides a simplified and improved resilient attachment capable of reducing assembly variances, thereby improving performance and customer satisfaction.

2. Disclosure Information

It is well known in the automotive noise, vibration and harshness art to use mass dampers to reduce or suppress vibration of specific components within an automotive vehicle. U.S. Pat. No. 5,024,464 generally discloses the use of an airbag unit, or a portion thereof, as a mass damper for suppressing the vibrations of the steering wheel. In each of the embodiments shown, the airbag unit is attached to the steering wheel by a rigid fastener disposed axially through a resilient bushing. Fasteners such as those disclosed produce a clamping force to the bushing. This clamping force preloads the bushing, which effects the rate of the bushing, and therefore the resonant frequency of the mass damper system. Since the airbag (as the mass) and bushings (as the spring) are tuned to a predetermined frequency to cancel objectionable motion of the steering wheel, variations in the rate of the bushing are undesirable. Either too little or too much clamping force will reduce the efficiency of the mass damper by moving its resonant frequency away from the predetermined frequency. Therefore, the clamping force applied to the bushing must be controlled during the assembly of the airbag to the steering wheel. Additionally, as a field serviceable fastener, it is not possible to ensure the application of the correct clamping force when serviced by personnel not having the proper tools.

It would be desirable to have a mass damper system using an airbag unit, or a portion thereof, resiliently attached to a steering wheel in a simple and repeatable manner so as to ensure efficient damping of vibrations, both after assembly and after service in the field.

SUMMARY OF THE INVENTION

The present invention provides a unique mass damper system using an airbag unit, or a portion thereof, for ensuring the consistent suppression of objectionable vibrations of the steering wheel of a motor vehicle, thereby improving customer satisfaction.

In the presently preferred embodiment, the vibration absorbing apparatus includes an absorber plate adapted to be rigidly secured to the steering wheel and a reaction plate located next to the absorber plate. An airbag is rigidly secured to the reaction plate.

A plurality of elastomeric members are located between and interconnect the absorber plate and the reaction plate. When installed, these elastomeric members are substantially uncompressed between the absorber plate and the reaction plate. Advantageously, this construction allows for consistent and repeatable assembly of the vibration absorbing apparatus to the steering wheel.

Other objects, features and advantages of the present invention will become apparent to those skilled in the art from the drawings, detailed description and claims which follow.

DESCRIPTION OF THE PREFERRED EMBODIMENT

Figure 1:
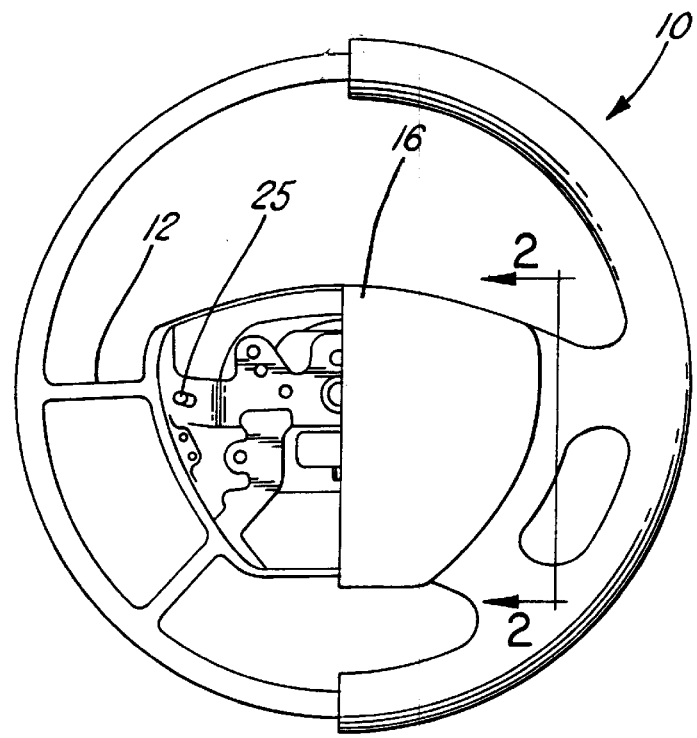
FIG. 1 is a partial sectional view of a steering wheel as used in motor vehicles.
Figure 2:
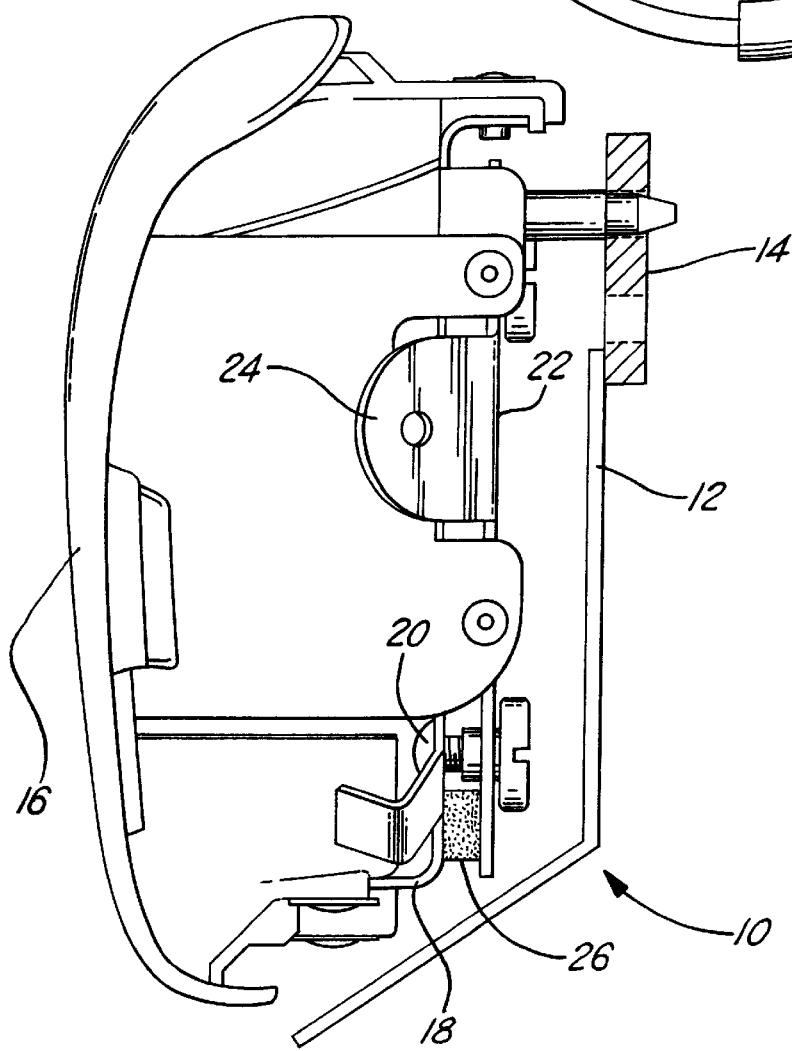
FIG. 2 is a partial sectional side view taken along line 2—2 of FIG. 1 illustrating a of a steering wheel having a vibration absorbing apparatus according to the present invention.

Referring now to FIGS. 1 and 2, a steering wheel 10 having steering wheel frame 12 for use in an automotive vehicle is shown. A hub 14 of the steering wheel frame 12 attaches the steering wheel 10 to a steering shaft which extends through the steering column.

An airbag assembly 16 is centrally located within the steering wheel 10. The airbag assembly 16 is securely fastened to a reaction plate 18. In the presently preferred embodiment as in FIG. 4, a set of capture screws 20 attach the airbag assembly 16 to the reaction plate 18.

An absorber plate 22 has a pair of attachment ears 24 for secure attachment to the steering wheel frame 12. Threaded fasteners passing through aperture 25 to engage the ears 24 are preferred to allow removal of the airbag assembly 16 and vibration absorbing apparatus for service.

Figure 3:
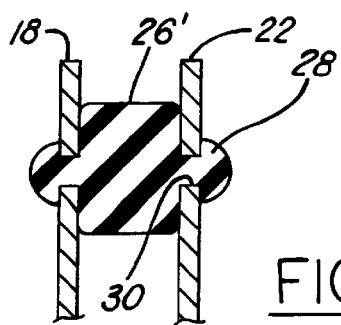
FIG. 3 is a partial sectional view illustrating an alternative attachment for an elastomeric member according to the present invention.

Elastomeric members 26, interconnect the reaction plate 18 to the absorber plate 22. In the preferred embodiment, there are four, elastomeric members disposed around the periphery of the absorber plate 22. The elastomeric members may be bonded to the reaction plate 18 and the absorber place 22. Alternatively, as shown in FIG. 3, the elastomeric members 26' may include protuberances 28 for extending through small apertures 30 in the reaction and absorber plates 18, 22 for positive retention. These attachments permit the reaction plate 18 to move relative to the absorber plate 22 constrained only by the predetermined resilience of the elastomeric members 26. Advantageously, the elastomeric members 26 are not preloaded by a compressive force between the reaction and absorber plates 18, 22, thereby reducing the variables that must be controlled for the tuning of the vibration absorber. As such, tuning may be achieved through variation of the mass of the airbag assembly 16 and the modulus of the elastomeric members.

It may be advantageous to employ an elastomeric material having a specific dynamic to static stiffness ratio and damping coefficient. This provides yet another alternative to tuning the vibration absorber. In the presently preferred embodiment, it was found to be advantageous to employ a rubber compound exhibiting a dynamic to static stiffness ratio of 1.5 and having a damping coefficient of 0.32.

Referring now to FIGS. 4–7, several alternative capture mechanisms will be described. The capture mechanism serves to limit the maximum excursion of the airbag assembly 16 within a predetermined range. It is desirable to provide for this function without changing the tuning advantages and performance characteristics of the vibration absorber during normal operation. In each of the alternatives, this is accomplished by having a first engagement member, such as a capture nut 40 disposed on the threaded end of the capture screw 20, disengaged from a second engagement member, such as a capture aperture 41, during vibration within the predetermined range.

The first and second engagement members engage when the movement of the reaction plate 18 relative to the absorber plate 22 reaches the limit of the predetermined range. This is beneficial in at least two ways. First, this limits the strain in the elastomeric members. Second, the capture mechanism retains the proper location of the airbag for deployment.

Figure 4:
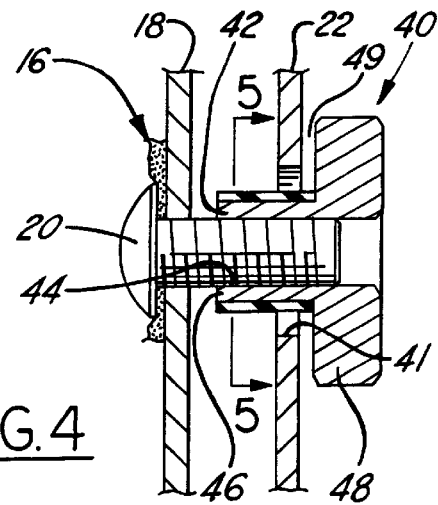
FIG. 4 is a sectional view illustrating a capture mechanism according to the present invention.
Figure 5:
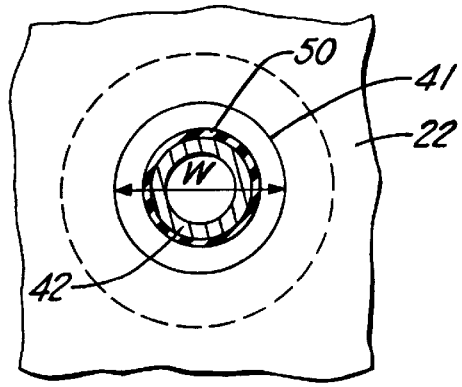
FIG. 5 is a sectional view taken along line 5—5 of FIG. 4 illustrating one embodiment of a capture mechanism according to the present invention.
Figure 6:
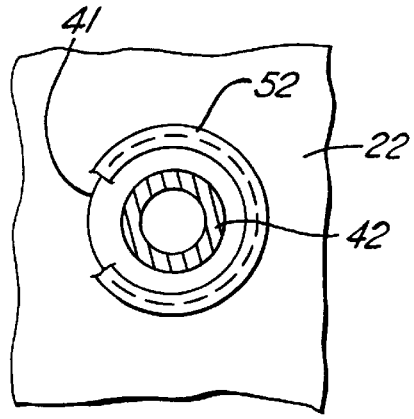
FIG. 6 is an alternative embodiment of a capture mechanism according to the present invention.

Referring now to FIGS. 4 and 5, the capture screw 20 and capture nut 40 will be more fully described. It should be recognized that more than one capture screw and nut assembly is preferred for desirable operation of this embodiment. The capture nut 40 includes a shank portion 42 having a bore 44 extending from a first end 46 toward a head 48 for receiving the capture screw 20. The shank 42 extends through the capture aperture 41 and engages the capture screw 20. When the capture nut 40 is securely fastened to the capture screw 20 a headspace 49 is created between the head 48 and the absorber plate 22. This permits unrestrained motion of the reaction plate 18 relative to the absorber plate 22. The capture aperture 41 has a predetermined width, W, which partially defines the predetermined range of motion for vibration absorption. The head 48 has a width slightly larger than the capture aperture 41 to prevent the capture nut 40 from passing through the capture aperture 41.

In a preferred embodiment, an elastomeric isolator is disposed between the capture aperture 41 and shank 42 to eliminate objectionable noise that would otherwise be created by the contact of the shank 42 with the periphery of the capture aperture 41. As can be seen in FIG. 5, the elastomeric isolator may be an elastomeric sheath 50 slipped over the shank 42. Alternatively, as can be seen if FIG. 6, an elastomeric ring 52 may be fitted to the periphery of the capture aperture 41.

Figure 7:
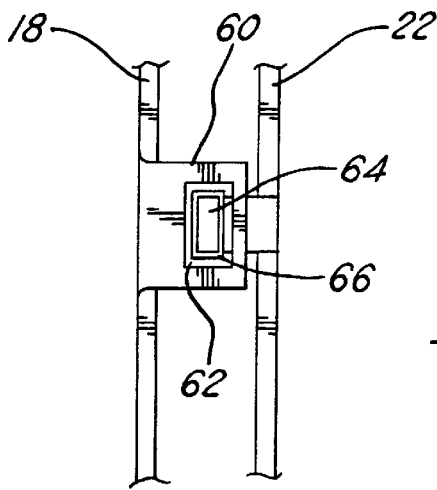
FIG. 7 is an alternative embodiment of a capture mechanism according to the present invention.

Referring now to FIG. 7, an alternative capture mechanism will be described more fully. A flange 60 is provided on the reaction plate 18 having a slot 62 therein. The slot 62 has a predetermined size corresponding to the predetermined range of motion desired for the vibration absorber. Similarly, the absorber plate 22 includes an extended tab 64 passing through the slot 62. The tab 64 will contact a periphery of the slot any time movement of the reaction plate and airbag assembly exceed the predetermined limit. It is also desirable to include an elastomeric band 66 on the tab 64 to reduce noise generated by contact with the slot 62. It should be recognized that the slot and tab 62, 64 may be arranged on opposite plates from that just described while providing equivalent operability and functionality.

Various other modifications and permutations of the present invention, no doubt, will occur to those skilled in the art. For instance, it should be readily apparent that the present invention would have equivalent operability and functionality if applied to airbag assemblies fastened to the instrument panel, side pillars and door structures rather than a steering wheel. Therefore, it is the following claims, including all equivalents, which define the scope of the present invention.

What is claimed is:

1. A vibration absorbing apparatus for use in a motor vehicle having a steering wheel, said vibration absorbing apparatus comprising:

an absorber plate adapted to be rigidly secured to the steering wheel;

a reaction plate disposed adjacent to said absorber plate;

an airbag rigidly secured to said reaction plate;

a plurality of elastomeric members disposed between and securing said absorber plate to said reaction plate, said elastomeric members being substantially uncompressed between said absorber plate and said reaction plate;

a slot disposed on said reaction plate;

a tab disposed on said absorber plate, said tab being adapted to extend through said slot and thereby limit movement of said reaction plate relative to said absorber plate beyond a predetermined range; and an elastomeric band disposed on said tab, said elastomeric band being operative to isolate noise generated by the contact of said tab with said slot.

* * * * *